US011700915B2

(12) United States Patent
Capone et al.

(10) Patent No.: US 11,700,915 B2
(45) Date of Patent: Jul. 18, 2023

(54) ARTICLE OF FOOTWEAR AND METHOD OF MANUFACTURE

(71) Applicant: NIKE, Inc., Beaverton, OR (US)

(72) Inventors: Francesca Capone, Portland, OR (US); Laura Papp, Portland, OR (US); S H Park, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 17/023,797

(22) Filed: Sep. 17, 2020

(65) Prior Publication Data

US 2021/0186158 A1   Jun. 24, 2021

Related U.S. Application Data

(60) Provisional application No. 62/950,192, filed on Dec. 19, 2019.

(51) Int. Cl.
*A43B 23/02* (2006.01)
*B29D 35/14* (2010.01)

(52) U.S. Cl.
CPC ...... *A43B 23/0255* (2013.01); *A43B 23/0215* (2013.01); *A43B 23/0235* (2013.01); *B29D 35/146* (2013.01)

(58) Field of Classification Search
CPC . B29D 35/146; A43B 23/0255; A43B 3/0031; A43B 3/0078; A43B 3/36; A43B 23/24; A41B 1/14
See application file for complete search history.

(56) References Cited

U.S. PATENT DOCUMENTS

| | | | |
|---|---|---|---|
| 2,801,477 A * | 8/1957 | Adams | A43B 3/0031 |
| | | | 40/636 |
| 2,887,792 A | 5/1959 | Staff | |
| 2,982,033 A | 5/1961 | Bingham, Jr. | |
| 3,032,896 A | 5/1962 | Weaver | |
| 4,611,416 A | 9/1986 | Lin | |
| 4,852,276 A * | 8/1989 | Savoca | A43B 1/0072 |
| | | | 36/136 |

(Continued)

FOREIGN PATENT DOCUMENTS

| | | |
|---|---|---|
| EP | 0593880 A1 | 4/1994 |
| EP | 2250914 A1 | 11/2010 |

(Continued)

*Primary Examiner* — Sharon M Prange
*Assistant Examiner* — Grady Alexander Nunnery
(74) *Attorney, Agent, or Firm* — Quinn IP Law (57) ABSTRACT

An article of footwear and a method of manufacturing the same is provided. The article comprises an upper having an inner layer and an outer layer coupled to the inner layer, such that the inner layer and the outer layer define a closed pocket therebetween. An insert is disposed in the closed pocket. The outer layer is formed of an at least partially transparent material, such that the insert is at least partially visible through the outer layer. The method comprises placing the insert in a recess defined by the outer layer of the upper, such that the insert abuts an inner surface of the outer layer and positioning the inner layer on the inner surface of the outer layer over the recess and the insert, such that the inner layer and outer layer form the closed pocket at the recess with the insert disposed within the closed pocket.

20 Claims, 4 Drawing Sheets

(56) References Cited

U.S. PATENT DOCUMENTS

| | | | |
|---|---|---|---|
| 5,173,968 A * | 12/1992 | Fox | A41D 27/08 2/108 |
| 5,359,790 A * | 11/1994 | Iverson | A43B 23/025 36/136 |
| 5,367,795 A | 11/1994 | Iverson et al. | |
| 5,659,979 A * | 8/1997 | Sileo | A43D 999/00 206/223 |
| 5,839,211 A * | 11/1998 | Pallera | A43B 3/0078 36/136 |
| 5,985,383 A | 11/1999 | Allen et al. | |
| 6,115,948 A * | 9/2000 | Mitchell | A41D 27/08 2/245 |
| 6,574,887 B2 | 6/2003 | Jones et al. | |
| 7,077,456 B2 | 7/2006 | Bailey et al. | |
| 7,284,343 B2 | 10/2007 | Jones et al. | |
| 7,318,290 B2 | 1/2008 | Jones et al. | |
| 7,331,128 B1 | 2/2008 | Navasky et al. | |
| 7,412,785 B1 | 8/2008 | Navasky | |
| 7,421,806 B2 | 9/2008 | Braynock et al. | |
| 7,841,107 B2 | 11/2010 | Braynock et al. | |
| 8,161,665 B2 | 4/2012 | Nakano | |
| 8,176,658 B2 | 5/2012 | Katz | |
| 8,904,675 B2 | 12/2014 | Koch et al. | |
| 9,132,430 B2 | 9/2015 | Lofts et al. | |
| 9,226,542 B2 | 1/2016 | Hartford et al. | |
| 9,301,569 B2 | 4/2016 | Donovan et al. | |
| 9,320,321 B2 | 4/2016 | Robinson, Jr. | |
| 9,351,532 B2 | 5/2016 | Mokos | |
| 9,723,895 B2 | 8/2017 | Schaefer et al. | |
| 9,801,431 B2 | 10/2017 | Goldwasser et al. | |
| 10,201,212 B2 | 2/2019 | Beers et al. | |
| 2004/0000073 A1 | 1/2004 | Jones et al. | |
| 2005/0170766 A1 | 8/2005 | Wang | |
| 2005/0282454 A1 * | 12/2005 | Meschter | A43D 8/02 442/306 |
| 2010/0011620 A1 * | 1/2010 | Nakano | A43B 1/0009 36/35 R |
| 2010/0199521 A1 * | 8/2010 | Katz | A43B 3/0078 36/100 |
| 2010/0205716 A1 | 8/2010 | Kim | |
| 2012/0110873 A1 * | 5/2012 | Chen | A43B 23/25 36/136 |
| 2012/0297643 A1 | 11/2012 | Shaffer et al. | |
| 2012/0324764 A1 | 12/2012 | Velez-Cruz | |
| 2013/0025157 A1 * | 1/2013 | Wan | A43B 7/06 36/45 |
| 2013/0031803 A1 * | 2/2013 | Koch | A43B 3/242 2/245 |
| 2013/0055590 A1 * | 3/2013 | Mokos | A43B 23/0265 36/45 |
| 2013/0312284 A1 | 11/2013 | Berend et al. | |
| 2014/0202038 A1 | 7/2014 | Turner | |
| 2014/0331521 A1 | 11/2014 | Katz | |
| 2014/0352175 A1 | 12/2014 | Katz | |
| 2015/0202915 A1 | 7/2015 | Lee | |
| 2015/0257487 A1 * | 9/2015 | Ruiz | A43B 23/07 36/108 |
| 2016/0037862 A1 | 2/2016 | Beye et al. | |
| 2016/0219967 A1 | 8/2016 | Smith et al. | |
| 2018/0263338 A1 | 9/2018 | Amis et al. | |
| 2019/0366590 A1 | 12/2019 | Farris et al. | |

FOREIGN PATENT DOCUMENTS

| | | |
|---|---|---|
| GB | 2172191 A | 9/1986 |
| WO | 2018144123 A1 | 8/2018 |

* cited by examiner

ARTICLE OF FOOTWEAR AND METHOD OF MANUFACTURE

CROSS-REFERENCE TO RELATED APPLICATIONS

This application claims the benefit of U.S. Provisional Application No. 62/950,192, filed Dec. 19, 2019, which is hereby incorporated by reference in its entirety.

TECHNICAL FIELD

The present disclosure generally relates to an article of footwear and a method of manufacturing an article of footwear.

BACKGROUND

Footwear often includes many components of many different materials. An article of footwear typically includes a sole structure configured to be located under a wearer's foot, to space the foot away from the ground. A footwear upper attached to the sole structure at least partially surrounds an interior volume that receives the foot. Footwear manufacturing strives to provide high quality, durable footwear in an environmentally conscience manner.

SUMMARY

In general, the article of footwear may comprise a sole structure and an upper fixedly attached to the sole structure. The upper may include a wall that at least partially surrounds an interior volume operative to receive a foot of a wearer. The wall may further comprise an inner layer and an outer layer coupled to the inner layer, such that the inner layer and the outer layer define a closed pocket therebetween. An insert may be disposed between the inner layer and the outer layer within a closed pocket, such that the outer layer protrudes outwardly from the inner layer at the closed pocket and is radially spaced apart from the inner layer by a thickness of the insert throughout the closed pocket. The outer layer may be formed of an at least partially transparent material, such that the insert is at least partially visible through the outer layer.

The method of manufacture may be a top down construction comprising placing the insert in a recess defined by the outer layer of the upper, such that the insert abuts an inner surface of the outer layer; and positioning the inner layer on the inner surface of the outer layer over the recess and the insert, such that the inner layer and outer layer form the closed pocket at the recess, with the insert disposed within the closed pocket.

The insert and the outer layer may extend outwardly and away from the inner layer at the closed pocket, such that the insert thickness creates a contoured and textured appearance of the upper, while allowing the inner layer to remain flush with the foot of a wearer. Further, the at least partially transparent nature of the outer layer may create a unique and deconstructed visual effect, such that the insert is at least partially visible through the outer layer.

BRIEF DESCRIPTION OF THE DRAWINGS

The drawings described herein are for illustrative purposes only, are schematic in nature, and are intended to be exemplary rather than to limit the scope of the disclosure.

DETAILED DESCRIPTION

While the present disclosure may be described with respect to specific applications or industries, those skilled in the art will recognize the broader applicability of the disclosure.

The terms "a," "an," "the," "at least one," and "one or more" are used interchangeably to indicate that at least one of the items is present. A plurality of such items may be present unless the context clearly indicates otherwise. All numerical values of parameters (e.g., of quantities or conditions) in this specification, unless otherwise indicated expressly or clearly in view of the context, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters.

In addition, a disclosure of a range is to be understood as specifically disclosing all values and further divided ranges within the range.

The terms "comprising," "including," and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. The term "any of" is understood to include any possible combination of referenced claims of the appended claims, including "any one of" the referenced claims.

Features shown in one figure may be combined with, substituted for, or modified by, features shown in any of the figures. Unless stated otherwise, no features, elements, or limitations are mutually exclusive of any other features, elements, or limitations. Furthermore, no features, elements, or limitations are absolutely required for operation. Any specific configurations shown in the figures are illustrative only and the specific configurations shown are not limiting of the claims or the description.

For consistency and convenience, directional adjectives are employed throughout this detailed description corresponding to the illustrated embodiments. Those having ordinary skill in the art will recognize that terms such as "above", "below", "upward", "downward", "top", "bottom", etc., may be used descriptively relative to the figures, without representing limitations on the scope of the invention, as defined by the claims. Any numerical designations, such as "first" or "second" are illustrative only and are not intended to limit the scope of the disclosure in any way.

The term "longitudinal", as used throughout this detailed description and in the claims, refers to a direction extending a length of a component. For example, a longitudinal direction of a shoe extends between a forefoot region and a heel region of the shoe. The term "forward" or "anterior" is used to refer to the general direction from a heel region toward a forefoot region, and the term "rearward" or "posterior" is used to refer to the opposite direction, i.e., the direction from the forefoot region toward the heel region. In some cases, a component may be identified with a longitudinal axis as well as a forward and rearward longitudinal direction along that axis. The longitudinal direction or axis may also be referred to as an anterior-posterior direction or axis.

The term "transverse", as used throughout this detailed description and in the claims, refers to a direction extending a width of a component. For example, a transverse direction of a shoe extends between a lateral side and a medial side of the shoe. The transverse direction or axis may also be referred to as a lateral direction or axis or a mediolateral direction or axis.

The term "vertical", as used throughout this detailed description and in the claims, refers to a direction generally perpendicular to both the lateral and longitudinal directions. For example, in cases where a sole is planted flat on a ground surface, the vertical direction may extend from the ground surface upward. It will be understood that each of these directional adjectives may be applied to individual components of a sole. The term "upward" or "upwards" refers to the vertical direction pointing towards a top of the component, which may include an instep, a fastening region and/or a throat of an upper. The term "downward" or "downwards" refers to the vertical direction pointing opposite the upwards direction, toward the bottom of a component and may generally point towards the bottom of a sole structure of an article of footwear.

In addition, the term "proximal" refers to a direction that is nearer a center of a footwear component or is closer toward a foot when the foot is inserted in the article of footwear as it is worn by a user. Likewise, the term "distal" refers to a relative position that is further away from a center of the footwear component or is further from a foot when the foot is inserted in the article of footwear as it is worn by a user. Thus, the terms proximal and distal may be understood to provide generally opposing terms to describe relative spatial positions.

To assist and clarify the subsequent description of various embodiments, various terms are defined herein. Unless otherwise indicated, the following definitions apply throughout this specification (including the claims). An "article of footwear", a "footwear article of manufacture", and "footwear" may be considered to be both a machine and a manufacture. Assembled, ready to wear footwear articles (e.g., shoes, sandals, boots, etc.), as well as discrete components of footwear articles (such as a midsole, an outsole, an upper component, etc.) prior to final assembly into ready to wear footwear articles, are considered and alternatively referred to herein in either the singular or plural as "article(s) of footwear".

The following discussion and accompanying figures disclose various footwear configurations and methods relating to manufacturing of the same. Although the article of footwear 10 is depicted as athletic footwear configured for sports, such as sneakers, in the associated Figures, concepts associated with the configurations and methods may be applied to various other types of athletic footwear articles, such as a hiking boots and shoes, soccer shoes, football shoes, running shoes, cross-training shoes, rugby shoes, basketball shoes, etc. However, the article of footwear 10 is not limited to sneakers or other sports shoes. In some embodiments, the disclosed provisions may be configured for use with various kinds of non-sports-related footwear, including but not limited to, boots, leisure shoes, dress shoes, work shoes, sandals, slippers, or any other category of footwear, which may also incorporate concepts discussed herein.

Figure 5:
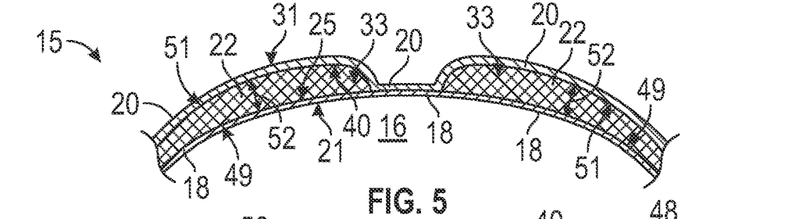
FIG. 5 is a cross-sectional view of the upper of an example article of footwear taken along line 5-5 in FIG. 1.

In a general sense, the article of footwear 10 of the present disclosure is manufactured via an environmentally friendly and sustainable process and designed to have a contoured and deconstructed appearance, wherein an insert 22 is disposed within a closed pocket 33 formed between an inner layer 18 and an outer layer 20 of a wall 15 of an upper 12. The outer layer 20 extends outwardly over the insert 22 and away from the inner layer 18 at the closed pocket 33. A thickness 52 of the insert 22 creates a contoured and textured appearance of the upper 12, while allowing the inner layer 18 to remain flush with the foot of a wearer, as shown in FIG. 5. Further, the outer layer 20 may be formed of an at least partially transparent material. The at least partially transparent nature of the outer layer 20 creates a unique and deconstructed visual effect, such that the insert 22, and/or a graphic 50 disposed thereon, is at least partially visible through the outer layer 20.

Referring to the drawings, wherein like reference numerals refer to like components throughout the several views, an article of footwear 10 is provided. As shown in FIGS. 1-7, the article of footwear 10 comprises an upper 12 fixedly attached to a sole structure 14.

The upper 12 is a portion of the article of footwear 10 that defines an interior volume or cavity 16 adapted to receive a foot of a wearer. The upper 12 in this disclosure further includes a wall 15 that at least partially surrounds the interior volume or cavity 16. For the purpose of consistency and clarity, the "interior" of the article of footwear 10 refers to space that is occupied by a wearer's foot when the article of footwear 10 is worn. The "inner side" of the wall 15, inner layer 18, or other shoe element refers to the face or surface of that panel or element that is (or will be) oriented toward the interior in a completed article of footwear 10. The "outer side" or "exterior" of an element refers to the face of that element that is (or will be) oriented away from the interior in a completed article of footwear 10.

As indicated in FIGS. 1-5, the article of footwear 10 may be divided into a forefoot region 32, a midfoot region 34, and a heel region 36, which are likewise the forefoot region 32, the midfoot region 34, and the heel region 36, of the sole structure 14 and the upper 12 respectively. The forefoot region 32 generally includes portions of the article of footwear 10 corresponding with the toes and the joints connecting the metatarsals with the phalanges. The midfoot region 34 generally includes portions of the article of footwear 10 corresponding with the arch area and instep of the foot. The heel region 36 corresponds with rear portions of the foot, including the calcaneus bone. The forefoot region 32, the midfoot region 34, and the heel region 36 are not intended to demarcate precise areas of the footwear 10 but are instead intended to represent general areas of the footwear 10 to aid in the following discussion.

Figure 1:
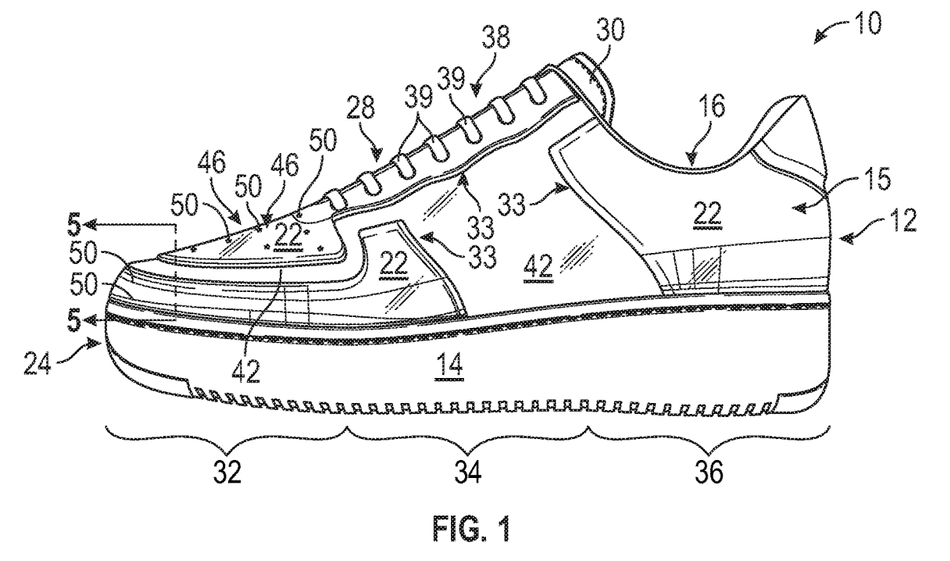
FIG. 1 is a schematic, perspective view of a lateral side of an example article of footwear including a sole structure, an upper, and at least one insert disposed in a closed pocket formed between an inner layer and an outer layer of the upper.
Figure 2:
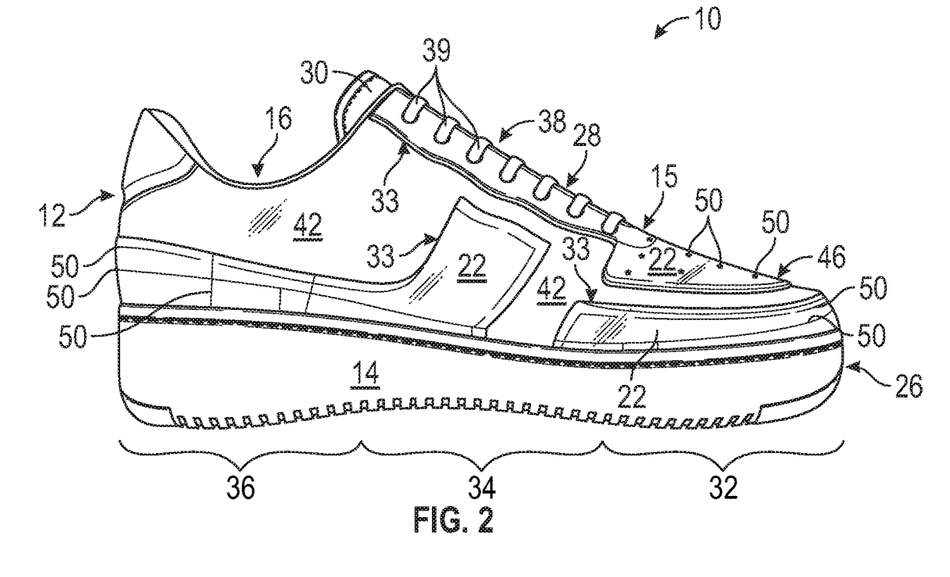
FIG. 2 is a schematic, perspective view of a medial side of an example article of footwear including a sole structure, an upper, and at least one insert disposed in a closed pocket formed between the inner layer and the outer layer of the upper.
Figures 3, 4:
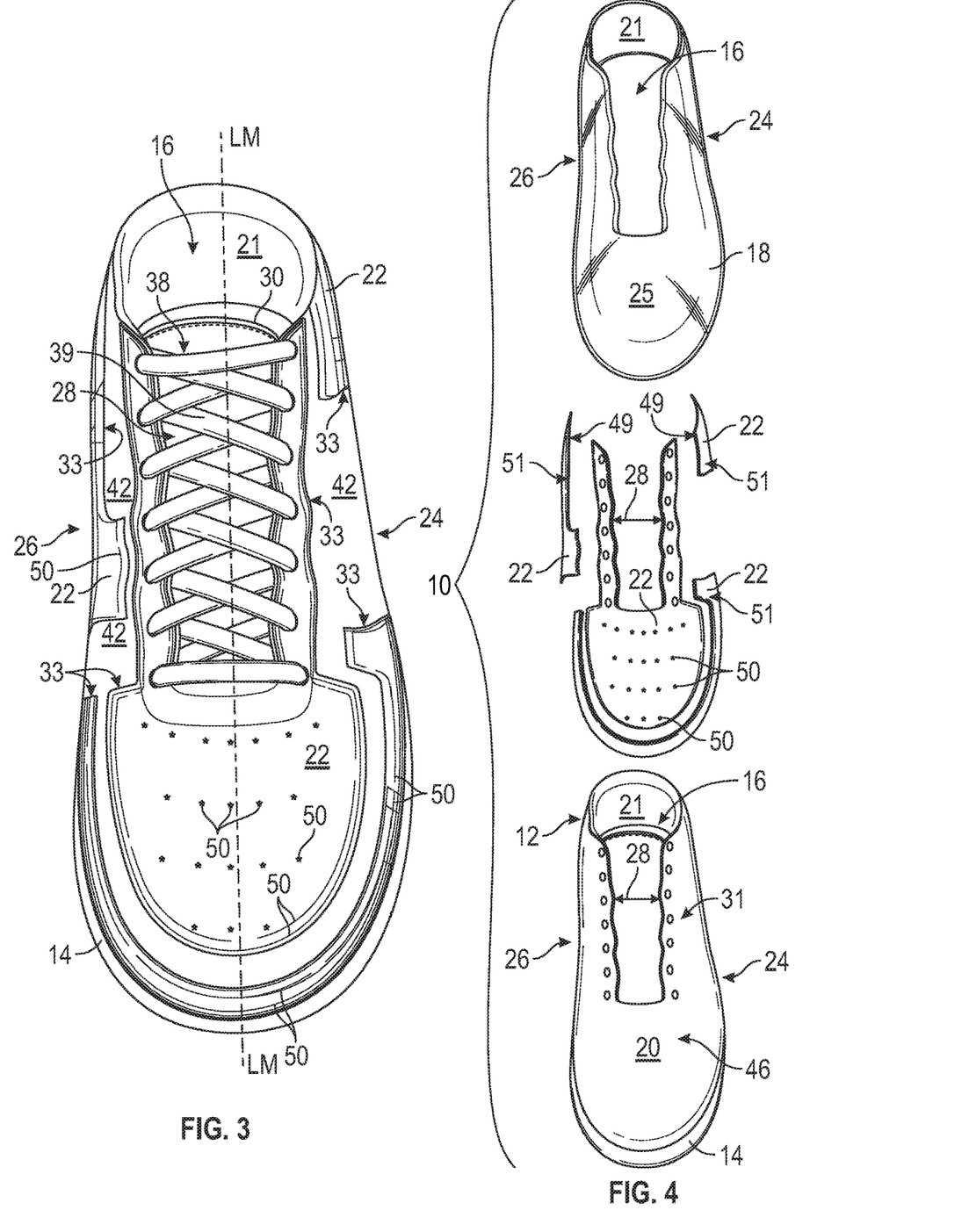
FIG. 3 is a schematic, perspective view of the top portion of an example article of footwear including a sole structure, an upper, and at least one insert disposed in a closed pocket formed between the inner layer and the outer layer of the upper.
FIG. 4 is a schematic, perspective, partially-exploded view of the top portion of an example article of footwear including a sole structure, an upper, and at least one insert disposed in a closed pocket formed between the inner layer and the outer layer of the upper.

The article of footwear 10 further has a lateral side portion 24 (FIGS. 1, 3, and 4) and a medial side portion 26 (FIGS. 2-4). The lateral side portion 24 and medial side 26 portion extend through each of the forefoot region 32, the midfoot region 34, and the heel region 36, and correspond with opposite sides of the article of footwear 10, each falling on an opposite side of a longitudinal midline LM of the article of footwear 10, partially indicated in FIG. 3. The medial side portion 26 is thus considered opposite to the lateral side portion 24.

The sole structure 14 may include provisions for attenuating ground reaction forces (i.e., cushioning and stabilizing the foot during vertical and horizontal loading). In addition, the sole structure 14 may be configured to provide traction, impart stability, and control or limit various foot motions, such as pronation, supination, or other motions. For example, the disclosed concepts may be applicable to footwear configured for use on any of a variety of surfaces, including indoor surfaces or outdoor surfaces. In some embodiments, the sole structure 14 may be configured to provide traction and stability on hard indoor surfaces (such as hardwood); soft, natural turf surfaces; or on hard, artificial turf surfaces.

In different embodiments, the sole structure 14 may include different components, which may, individually or collectively, provide an article with a number of attributes, such as support, rigidity, flexibility, stability, cushioning, comfort, reduced weight, or other attributes. For example, the sole structure 14 may include a midsole, an outsole, and a cushioning layer and/or insole. The compressible polymer element of the sole structure 14 attenuates ground reaction forces (i.e., provides cushioning) when compressed between the foot and the ground during walking, running, or other ambulatory activities, and may be formed from a compressible polymer element, such as a thermoset or a thermoplastic, for example, a cross-linked thermosetting plastic, a cross-linked thermosetting resin, or a crosslinked thermosetting elastomer (e.g., rubber), a polyurethane foam, ethylvinylacetate (EVA) foam, an ionomeric polymer foam, or the like. In further configurations, the midsole may incorporate fluid-filled chambers, plates, moderators, or other elements that further attenuate forces, enhance stability, or influence the motions of the foot.

The midsole may be a single, one-piece midsole, or could be multiple components integrated as a unit. In some embodiments, the midsole may be integrated with the outsole as a unisole. The outsole may be one-piece, or may be several outsole components, and may be formed from a wear-resistant rubber material that may be textured to impart traction and/or may include traction elements such as cleats secured to the midsole.

When the foot is positioned within the foot-receiving interior cavity 16 of the article of footwear 10, the foot is supported on a foot-facing surface of the midsole. Optionally, the foot-facing surface of the midsole may be covered by a strobel secured to a lower region of the upper 12. Also, optionally, an insole may rest on the strobel or directly on the sole structure 14 in embodiments without a strobel, in which case the foot is supported by both the sole structure 14 and the insole.

It may be appreciated however that the sole structure 14 is not limited to incorporating traditional sole components and may incorporate various, different kinds of elements arranged at the outermost, innermost, and intermediate 'layers', or locations, of the sole. Thus, the sole structure 14 can include an outer sole member or element, which may or may not coincide with a conventional 'outsole'. Likewise, the sole structure 14 may include an inner sole member or element, which may or may not be an 'insole'. Further, the sole structure 14 can include any number of intermediate and/or middle sole members or elements, which may or may not be a 'midsole'.

The sole structure 14 may be permanently and/or fixedly attached to one or more portions of the upper 12 (for example, with adhesive, stitching, welding, or other suitable techniques) and may have a configuration that extends between the upper 12 and the ground. For purposes of this disclosure, the term "permanently attached" shall refer to two components joined in a manner such that the components may not be readily separated (for example, without destroying one or both of the components). In addition, two components may be "permanently attached" by virtue of being integrally formed, for example, through a molding process.

In general, the upper 12 includes provisions to reduce any tendency of the foot to be pulled away from the sole structure 14 during use. In some embodiments, the upper 12 may be a conventional upper 12 defining and at least partially surrounding an interior volume or cavity 16 for receiving a foot of a wearer. The wall 15 of the upper 12 may be formed of a variety of materials, such as leather, textiles (woven or non-woven), polymers, cotton, foam, composites, etc. The wall 15 may include an inner layer 18 of a material that has elasticity, breathability, or both in order to aid with foot insertion and comfort. For example, the inner layer 18 may be a leather or synthetic leather material, polymeric material, textile material capable of providing elasticity, and may be of a braided construction, a knitted (e.g., warp-knitted) construction, or a woven construction.

In other embodiments, the upper 12 may be configured to provide a 'tension fit' about a wearer's foot. As used herein, the term tension fit refers to a fit that ensures the upper is pulled against the foot at all times, including on a lower side where the sole of the foot contacts a bottom portion of the upper 12. In some cases, a tension fit upper may be configured so that when no foot is present within the interior cavity 16, the interior cavity 16 has a volume that is smaller than the volume after a foot has been inserted. In other words, the upper 12 may be configured to stretch or expand as a foot is inserted. Such a configuration may provide an upper 12 that 'stays with' the foot, and especially the sole of the foot, at all times during any activities (e.g., running, jumping, walking, etc.). A tension fit may or may not require stretching in the upper 12. In some cases, the upper 12 can be configured to stretch significantly when a foot is inserted. In other cases, however, the upper 12 may simply fit the foot very snugly without significant expansion.

The wall 15 at least partially defines the lateral side portion 24 and medial side portion 26 of the upper 12, such that upper 12 may further define a vamp 46 that extends into the forefoot region 32 and the midfoot region 34 on each of the lateral side 24 and the medial side 26 of the upper 12. The wall 15 of the upper 12 may form at least a portion of the vamp 46. The wall 15 further defines a throat opening 28 disposed between the lateral side portion 24 (FIGS. 1 and 3-4) and the medial side portion 26 (FIGS. 2-4). The throat opening 28 may permit a wearer's foot to extend into the interior volume 16. The throat opening 28 may be bordered or surrounded by an eyestay reinforcement.

The throat opening 28 may be further configured to house a closure system 38, such as laces 39 or the like, that may selectively couple the lateral side 24 and the medial side 26 across the throat opening 28, while providing an ability to adjust the girth of the upper 12. The closure system 38 may generally include a unitary closure panel or tongue portion 30 and a plurality of laces 39 each extending between the lateral side portion 24 and the medial side portion 26 of the wall 15. The tongue portion 30 may be integrated with or separately secured to the wall 15. The tongue portion 30 may extend over the instep region of the foot.

More particularly, the wall 15 may further comprise an inner layer 18 that defines the interior cavity 16 adapted to receive a foot of a wearer. In some embodiments, the inner layer 18 may include multiple discrete layers. As is shown in FIGS. 4 and 6D, the inner layer 18 is a one-piece inner layer 18. The inner layer 18, thereby has an interior surface 21 that contacts the wearer's foot and an outer surface 25 that faces away from the foot of the wearer and the interior volume 16. The inner layer 18 may be comprised of a material that has elasticity, breathability, or both in order to aid with foot insertion and comfort.

The upper 12 may further include an outer layer 20 formed of an at least partially transparent material, such as a transparent or translucent textile, polymer, mesh, or the like. As used herein, a component is "partially transparent" if it has a luminous transmittance (i.e., a percentage of incident light that is transmitted) of at least eighty (80%) percent and haze (i.e., percentage of transmitted light that is scattered) of not more than fifty-six (56%) percent. Those skilled in the art will readily understand a variety of methods to determine luminous transmittance and haze of an object, such as the outer layer 20. The outer layer 20 may further comprise an open mesh material. The outer layer 20 may further comprise a monofilament mesh material. The mesh material may be Nylon, Polyester, or the like. As is shown in FIGS. 4 and 6B, the outer layer 20 is a one-piece outer layer 20. The outer layer 20 may further define an outermost surface 31, wherein the outermost surface 31 of the outer layer 20 is an outermost surface of the upper 12. The outer layer 20 may further define an outer layer inner surface 40.

The outer layer 20 may be coupled to the inner layer 18, such that a closed pocket 33 is formed between the inner layer 18 and outer layer 20 of the wall 15. As is evident in FIGS. 6B, 6D, and 6E, an entire outer perimeter 19 of the inner layer 18 is coincident with an entire outer perimeter 23 of the outer layer 20 when the outer layer 20 is coupled to the inner layer 18 at the bonded areas 42. In the present disclosure, the closed pocket 33 is defined as a closed void space between the inner layer 18 and the outer layer 20. The closed pocket 33 is not an open pocket within which contents may be freely interchanged to change the outward appearance of the article of footwear 10. The closed pocket 33 is sealed, such that, after the final forming of the article of footwear 10 is complete, the inner layer 18 and outer layer 20 are permanently attached, i.e., joined in a manner such that the components may not be readily separated (for example, without destroying one or both of the components).

The outer layer 20 may be further coupled to and permanently attached to the inner layer 18 at a plurality of bonded areas 42. Said another way, the outer layer 20 may be selectively coupled to the inner layer 18 at the plurality of bonded areas 42 to define a plurality of closed pockets 33. The bonded areas 42 enclose and/or surround an outer boundary of each of the closed pockets 33, such that each of the closed pockets 33 is enclosed and bordered along an entirety of the respective outer boundary by the bonded areas 42. However, while the bonded areas 42 border the closed pockets 33, the closed pockets 33 and the bonded areas 42 do not overlap. In this way, the closed pockets 33 have a plurality of different predefined shapes.

The plurality of bonded areas 42 may be defined in multiple ways. In one example, the inner layer 18 and the outer layer 20 may be welded together. In this way, the plurality of bonded areas 42 may be defined as a plurality of pocket boundary weld junctions, such that the inner layer 18 and the outer layer 20 may be permanently attached via welding, i.e., the inner layer 18 is welded to the outer layer 20 at the plurality of bonded areas 42.

As utilized herein, the term "welding" or variants thereof (such as "thermal bonding") is defined as a technique for securing two elements to one another that involves a softening or melting of a polymer material within at least one of the elements such that the materials of the elements are secured to each other when cooled. Similarly, the term "weld" or variants thereof (e.g., "thermal bond") is defined as the bond, link, or structure that joins two elements through a process that involves a softening or melting of a polymer material within at least one of the elements such that the materials of the elements are secured to each other when cooled.

Welding generally produces a heat-affected zone in which the materials of the two joined components are intermingled. This heat-affected zone may be considered a "weld" or "thermal bond." Further, welding may involve (a) the melting or softening of two layers that include polymer materials, such that the polymer materials from each layer intermingle with each other (e.g., diffuse across a boundary layer between the polymer materials) and are secured together when cooled, as well as (b) the melting or softening a polymer material in a first layer such that the polymer material extends into or infiltrates the structure of a second layer (e.g., infiltrates crevices or cavities formed in the second layer or extends around or bonds with filaments or fibers in the second layer) to secure the layers together when cooled. Further, welding may occur when only one layer includes a polymer material, when both layers include polymer materials, or when a polymer material or resin is disposed between the respective layers.

Accordingly, in a welded example, a first hot melt layer 48 may be coupled to and/or disposed on the inner surface 40 of the outer layer 20 at the bonded areas 42, such that the outer layer 20 is adhered to the inner layer 18 at the plurality of bonded areas 42. Bonding or welding of the inner layer 18 to the outer layer 20 is performed via hot pressing the inner layer 18, the first hot melt layer 48, and the outer layer 20 together in a hot press machine, such that the first hot melt layer 48 is heated to a viscous state, such that the first hot melt layer 48 infiltrates the inner layer 18 and the outer layer 20 at each of the plurality of bonded areas 42, and the hot melt layer 48 is then cooled to a solid state, such that the inner layer 18 and outer layer 20 are bonded to one another via the first hot melt layer 48.

The wall 15 of the upper 12 may further include an insert 22 disposed in the closed pocket 33 between the inner layer 18 and the outer layer 20. The insert 22 may be comprised of a compressible foam material, such as an Ethylene-Vinyl Acetate (EVA) foam material, an ionomeric foam material, or the like. The insert 22 may be die cut into a predefined shape and size, such that insert 22 has an outer boundary that corresponds with the predefined different shapes of the closed pockets 33.

The insert 22 may define an inner insert surface 49 and an outer insert surface 51. As shown in FIG. 5, the insert 22 may have a thickness 52 defined between the inner insert surface 49 and the outer insert surface 51. A graphic 50 may be applied to or disposed on the outer insert surface 51. The graphic 50 may be a decorative or aesthetic element disposed on the insert 22 to enhance ascetics, design, display branding, or the like. The graphic 50 may be drawn or printed on the insert 22, applied to the insert 22 via a transfer film, adhered to the outer insert surface, or the like.

Accordingly, the inner insert surface 49 abuts the outer surface 25 of the inner layer 18 and the outer insert surface 51 abuts the inner surface 40 of the outer layer 20. In this way, at the closed pocket 33, the outer layer 20 protrudes outwardly from the inner layer 18 and is spaced apart from the inner layer 18 by the insert thickness 52 throughout the closed pocket 33. At each of the bonded areas 42 and the closed pocket 33, the inner layer 18 remains flush with the interior cavity 16 and the foot of the wearer throughout. Said another way, the insert 22 does not protrude into the interior volume 16 (FIG. 5). The insert 22 and the outer layer 20 extend outwardly and away from the inner layer 18 at the closed pocket 33, such that the insert thickness 52 creates a contoured and textured appearance of the upper 12, while allowing the inner layer 18 to remain flush with the foot of a wearer.

The insert 22 may be coupled to the inner layer 18. In one example, a second hot melt layer 58 may be coupled to or disposed on the inner insert surface 49 of each insert 22, such that each inner insert surface 49 is adhered to the outer surface 25 of the inner layer 18 via the second hot melt layer 58. The insert 22 is not fixed to the outer layer 20; the outer insert surface 51 merely abuts the inner surface 40 of the outer layer 20 throughout the closed pocket 33, such that the outer layer 20 is radially spaced apart from the inner layer 18 by the thickness 52 of the insert 22 throughout the closed pocket 33 (FIG. 5). Said another way, the insert 22 is free floating with respect to the outer layer 20.

To provide a unique and deconstructed visual effect, the outer layer 20 may be formed of an at least partially transparent material, such that the insert 22 and/or the graphic 50 disposed on the outer insert surface 51 is at least partially visible through the outer layer 20.

As detailed herein above, in a general sense, the article of footwear 10 of the present disclosure is designed to be manufactured in an environmentally friendly and sustainable process 100. Accordingly, as detailed by the method of manufacture 100 disclosed herein and shown by example in FIGS. 1-7, generally comprises a top down construction including placing the insert 22 in a recess 44 defined by the outer layer 20 of the wall 15 of the upper 12, such that the outer insert surface 51 abuts the inner surface 40 of the outer layer 20 and positioning the inner layer 18 on the inner surface 40 of the outer layer 20 and over the recess 44 and the insert 22, such that the inner layer 18 and outer layer 20 form the closed pocket 33 at the recess 44 with the insert 22 disposed within the closed pocket 33.

Figure 6A:
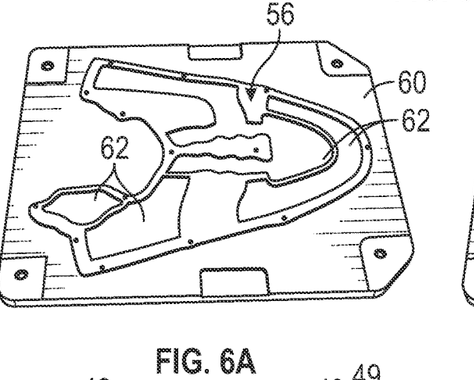
FIG. 6A is a perspective view of an example silicone pad, wherein the silicone pad defines a pressing surface and the pressing surface further defines at least one cavity.
Figure 6B:
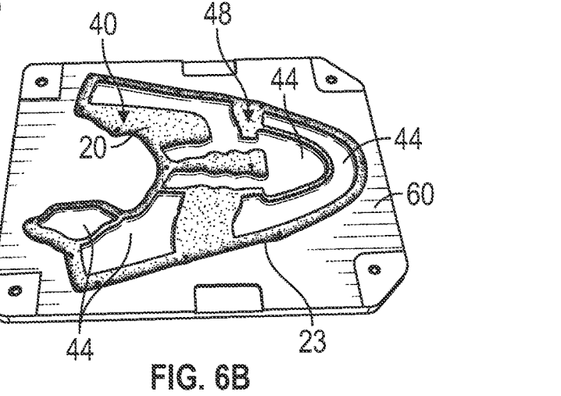
FIG. 6B is a perspective view of an at least partially transparent outer layer of the upper positioned over the pressing surface of the silicone pad and pressed into the at least one cavity to form a recess within the at least one cavity.
Figure 7:
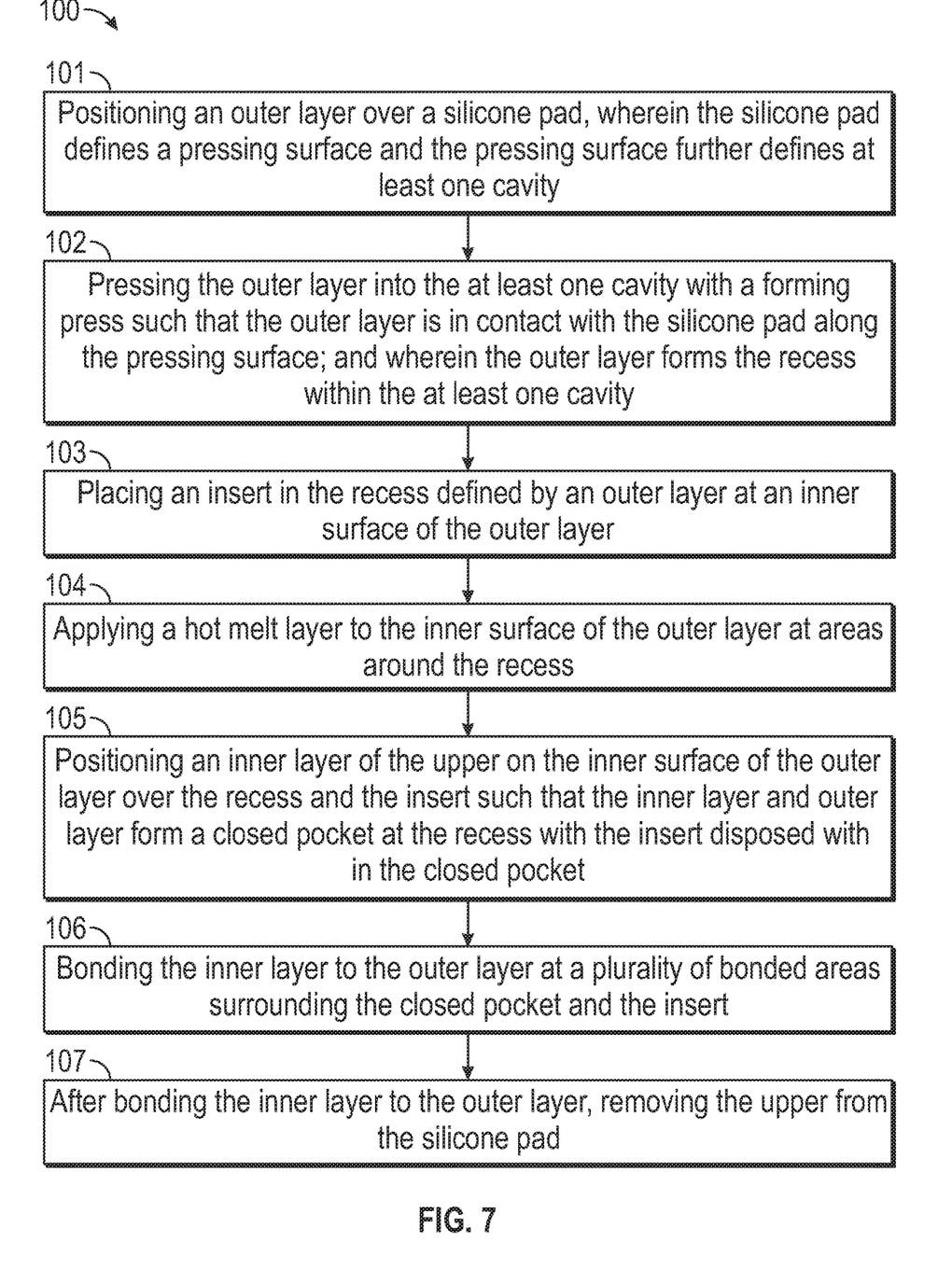
FIG. 7 is a flow chart of the example method of manufacturing the article of footwear of FIGS. 1-6E.

In this way, as shown in FIG. 6A and step 101 of FIG. 7, the outer layer 20, comprised of an at least partially-transparent material, may be positioned over a silicone pad 60 and secured with locating pins. The silicone pad 60 may define a pressing surface 56, and the pressing surface 56 may further define at least one cavity 62 having a predetermined shape and size. The pressing surface 56 may further define a plurality of cavities 62, each having a different predetermined shape and size. The outermost surface 31 of the outer layer 20 may be in contact with the pressing surface 56 when the outer layer 20 is positioned over the silicone pad 60.

At step 102 of FIG. 7 and as shown in FIG. 6B, the outer layer 20 may be pressed into the at least one cavity 62, such that the outermost surface 31 of the outer layer 20 is in contact with the silicone pad 60 along the contour of pressing surface 56. In this way, the outer layer 20 forms a recess 44 within the at least one cavity 62, such that the recess 44 has the predetermined shape and size of the respective cavity 62. The outer layer 20 may be pressed into the at least one cavity 62 to form the recess 44 via a forming press or another suitable pressing and/or forming process. As such, in the assembled article of footwear 10, the outer layer 20 extends outwardly and away from the inner layer 18 at the preformed recess 44 independently of the inner layer 18 and the insert 22. Stated differently, the outer layer 20 defines the preformed recess 44 even without the insert 22 in the sealed closed pocket 33 and even without coupling the outer layer 20 to the inner layer 18 at the plurality of bonded areas 42.

Figure 6C:
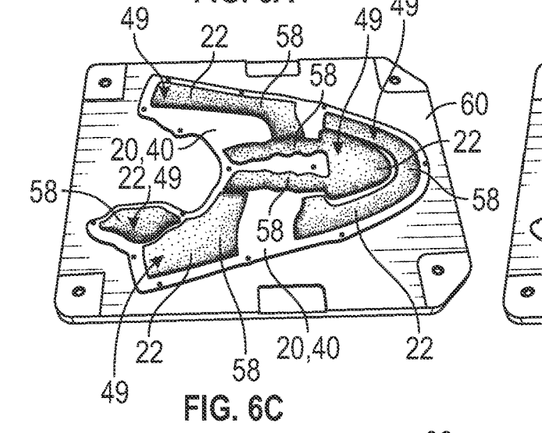
FIG. 6C is a perspective view of at least one insert positioned in the recess defined by the outer layer within the at least one cavity.
Figure 6D:
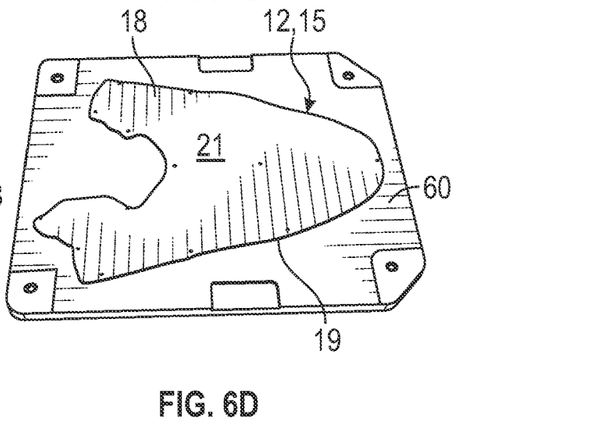
FIG. 6D is a perspective view of an inner layer of the upper positioned on an inner surface of the outer layer and over the recess and the insert, such that the inner layer and outer layer form a closed pocket at the recess with the insert disposed within the closed pocket.

At step 103 of FIG. 7 and as shown in FIG. 6C, inserts 22 may be die-cut into a predetermined shape and predetermined size that corresponds with the predetermined shape and size of a respective recess 44. Further, in some examples, a graphic 50 may be applied to the outer insert surface 51. The graphic 50 may be a decorative or aesthetic element disposed on the insert 22 to enhance ascetics, design, display branding, or the like. The graphic 50 may be drawn or printed on the insert 22, applied to the insert 22 via a transfer film, adhered to the outer insert surface 51, or the like.

The respective inserts 22, once die-cut to shape and size and having any desired graphics applied thereto, may be placed in a respective recess 44 having the same predetermined shape and size as the respective insert 22. When the insert 22 is placed in the recess 44, the insert 22 is placed such that the outer insert surface 51 is placed in contact with the inner surface 40 of the outer layer 20. However, the outer insert surface 51 of the insert 22 is not coupled with, attached to, or otherwise engaged with the inner surface 40 of the outer layer 20, the outer insert surface 51 merely abuts the inner surface 40 of the outer layer 20. With the outer layer 20 being formed of an at least partially-transparent material, the outer insert surface 51 and any graphic 50 applied thereto is visible through the outer layer 20.

In some examples, at step 104 of FIG. 7, a hot melt layer 48 may be applied to the inner surface 40 of the outer layer 20 at areas that surround the recess 44, i.e., the bonded areas 42. Another hot melt layer 58 may be applied to the interior insert surface 49 (FIG. 6C).

At step 105 of FIG. 7 and as shown in FIG. 6D, the inner layer 18 of the upper 12 is positioned over the recess 44 and the insert 22, such that the exterior surface 25 of the inner layer 18 is in contact with the inner surface 40 of the outer layer 20 and the inner insert surface 49. In this way, the inner layer 18 and the outer layer 20 form the closed pocket 33 at the recess 44 with the insert 22 disposed within the closed pocket 33. The inner layer 18 may be secured in position over the outer layer 20, the recess 44, and the insert 22 via a plurality of locating pins.

At step 106 of FIG. 7, the inner layer 18 may then be bonded to the outer layer 20 at the plurality of bonded areas 42 around the closed pocket 33 and the insert 22. The outer layer 20 may be bonded to the inner layer 18 at the bonded areas 42 via a hot melt layer 48, simultaneously as the inner insert surface 49 is bonded to the inner layer exterior surface 25 via the hot melt layer 58 at the recess 44 to form the closed pocket 33 with the insert 22 disposed therein. Bonding the inner layer 18 and the outer layer 20 at the bonded area lines 42 and bonding the insert 22 to the inner layer 18 at the closed pocket 33 may be completed via hot pressing, such that, in one example, the inner layer 18 and the outer layer 20 may be welded together.

Accordingly, in such an example, bonding or welding of the inner layer 18 to the outer layer 20 is performed via hot pressing the inner layer 18, the first hot melt layer 48, and the outer layer 20 together in a hot press machine, such that the first hot melt layer 48 is heated to a viscous state, such that the first hot melt layer 48 infiltrates the inner layer 18 and the outer layer 20 at each of the plurality of bonded areas 42, and the hot melt layer 48 is then cooled to a solid state, such that the inner layer 18 and outer layer are bonded to one another via the first hot melt layer 48. Simultaneously, welding of the inner layer 18 to the insert 22, is performed via hot pressing the inner layer 18, second hot melt layer 58, and the insert 22 together in the hot pressing machine, such that the second hot melt layer 58 is heated to a viscous state, such that the second hot melt layer 58 infiltrates the inner layer 18 and the insert 22 at the closed pocket 33, and the hot melt layer 58 is then cooled to a solid state, such that the inner layer 18 and the insert 22 are bonded to one another via the second hot melt layer 58.

Figure 6E:
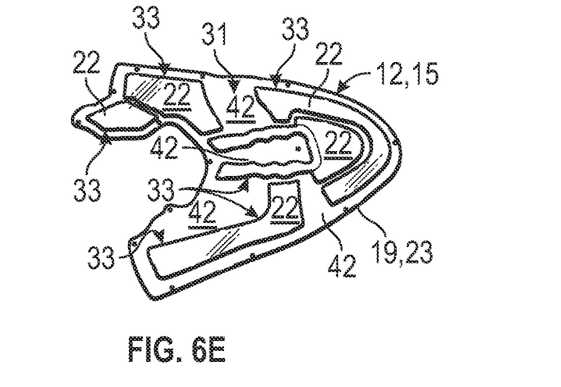
FIG. 6E is a perspective view of a fully formed upper including the inner layer, the insert, and the outer layer, wherein the outer layer is coupled to the inner layer.

At step 107 of FIG. 7, after bonding the inner layer 18 to the outer layer 20, the wall 15 of the upper 12 may be removed from the silicone pad 60. As shown in FIG. 6E, the outer layer 20 protrudes and extends outwardly from the inner layer 18 and is radially spaced apart from the inner layer 18, by the insert thickness 52, at the closed pocket 33, such that the insert thickness 52 creates a contoured and textured appearance of the upper 12, while allowing the inner layer 18 to remain flush with the foot of a wearer.

Further, to add a unique and deconstructed visual effect, the at least partially-transparent nature of the material of the outer layer 20 allows the insert 22 and any graphic 50 applied thereto to be at least partially visible through the outer layer 20.

In one example, the closed pocket 33 may be disposed in the forefoot region 32. In another example, the closed pocket 33 may be disposed in the midfoot region 34. In another example, the closed pocket 33 may be disposed in the heel region 36. In another example, the closed pocket 33 may be disposed in each of the forefoot region 32, the midfoot region 34, and the heel region 36. In yet another example embodiment, the wall 15 of the upper 12 at least partially defines a vamp 46 that extends into the forefoot region 32 and the midfoot region 34 on each of the lateral side 24 and the medial side 26 of the upper 12. In such an example, the closed pocket 33 may be positioned or disposed in the vamp 46.

Irrespective of where the closed pocket 33 is positioned on the upper 12, the insert thickness 52 creates a contoured and textured appearance of the upper 12 and the transparent and/or translucent nature of the outer layer 20 allows the insert 22 and any graphics 50 or coloration disposed thereon or applied thereto, to be at least partially visible through the outer layer 20. In this way, the insert 22 and any graphics 50 or coloration applied thereto or disposed thereon may be readily seen by viewers or wearers of the article of footwear 10 to showcase a deconstructed visual effect and the sustainable and environmentally conscience method of manufacture 100.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

Benefits, other advantages, and solutions to problems, and any element or elements that may cause any benefit, advantage, or solution to occur or become more pronounced, however, are not to be construed as critical, required, or essential features or elements of any or all of the claims, unless such benefits, advantages, solutions, or elements are expressly stated in such claims.

The following Clauses provide example configurations of an article of footwear disclosed herein.

Clause 1. An article of footwear comprising: an upper at least partially surrounding an interior volume operative to receive a foot of a wearer, wherein the upper comprises an inner layer and an outer layer, wherein the inner layer is disposed between the interior volume and the outer layer, and wherein the outer layer is coupled to the inner layer, such that the inner layer and the outer layer define a closed pocket therebetween; and an insert disposed in the closed pocket between the inner layer and the outer layer, such that the outer layer protrudes outwardly from the inner layer at the closed pocket; and wherein the outer layer is formed of an at least partially transparent material, such that the insert is at least partially visible through the outer layer.

Clause 2. The article of footwear of clause 1, wherein the insert has an outer insert surface, wherein a graphic is applied to the outer insert surface and is at least partially visible through the outer layer.

Clause 3. The article of footwear of any of clauses 1-2 wherein the insert is comprised of a compressible foam material.

Clause 4. The article of footwear of clause 3 wherein the compressible foam material is Ethylene-Vinyl Acetate (EVA) foam.

Clause 5. The article of footwear of any of clauses 1-4 wherein the insert has an inner insert surface, an outer insert surface, and an insert thickness defined between the inner insert surface and the outer insert surface, wherein the inner insert surface is coupled to the inner layer and the outer insert surface abuts the outer layer, such that the outer layer is spaced apart from the inner layer by the insert thickness throughout the closed pocket.

Clause 6. The article of footwear of any of clauses 1-5, wherein the outer layer and the insert are not fixed to one another.

Clause 7. The article of footwear of any of clauses 5-6, wherein the upper further comprises a hot melt layer coupled to the inner insert surface, and wherein the respective hot melt layer is configured to adhere the inner insert surface to an outer surface of the inner layer.

Clause 8. The article of footwear of any of clauses 5-6, wherein: the outer layer is selectively coupled to the inner layer at a plurality of bonded areas, and wherein the plurality of bonded areas defines the closed pocket, such that the closed pocket is enclosed by the bonded areas.

Clause 9. The article of footwear of clause 8, wherein the upper further comprises a hot melt layer coupled to an inner surface of the outer layer at the bonded areas, and wherein the hot melt layer is configured to adhere an outer surface of the inner layer to an inner surface of the outer layer at the bonded areas.

Clause 10. The article of footwear of any of clauses 8-9 wherein the closed pocket is one of a plurality of closed pockets defined by the inner layer and the outer layer, such that each of the closed pockets is disposed between the inner layer and the outer layer and enclosed by the bonded areas; the insert one of a plurality of inserts; and each of the plurality of inserts is disposed in a different one of the closed pockets.

Clause 11. The article of footwear of clause 10 wherein the closed pockets have a plurality of different predefined shapes; and wherein each of the inserts has an outer perimeter that corresponds with a respective one of the different predefined shapes.

Clause 12. The article of footwear of any of clauses 10-11, further comprising a sole structure fixedly attached to the upper and underlying the interior volume; wherein the closed pockets are disposed in at least one of a lateral side, a medial side, or a vamp of the upper.

Clause 13. A method of manufacturing an article of footwear, the method of manufacturing comprising: placing an insert in a recess defined by an outer layer of an upper, such that the insert abuts an inner surface of the outer layer; and positioning an inner layer of the upper on the inner surface of the outer layer and over the recess and the insert, such that the inner layer and the outer layer form a closed pocket at the recess, such that the insert is disposed within the closed pocket.

Clause 14. The method of clause 13, further comprising: bonding the inner layer to the outer layer at a plurality of bonded areas surrounding the closed pocket and the insert, such that the closed pocket is enclosed by the bonded areas.

Clause 15. The method of any of clauses 13-14, wherein the insert and the outer layer are unfixed to one another.

Clause 16. The method of any of clauses 13-15 further comprising: prior to positioning the inner layer of the upper on the inner surface of the outer layer, applying a hot melt layer to the inner surface of the outer layer at the plurality of bonded areas around the recess; wherein bonding the inner layer to the outer layer is performed via hot pressing the inner layer to the outer layer at the bonded areas around the recess, and wherein the outer layer protrudes outwardly from the inner layer by a thickness of the insert throughout the closed pocket.

Clause 17. The method of any of clauses 13-15 further comprising: prior to positioning the inner layer of the upper on the inner surface of the outer layer, applying a hot melt layer to an inner surface of the insert; wherein bonding the inner layer to the outer layer simultaneously bonds the inner surface of the insert to the inner layer in the closed pocket; and wherein the outer layer protrudes outwardly from the inner layer by a thickness of the insert throughout the closed pocket.

Clause 18. The method of any of clauses 13-17 further comprising: prior to placing the insert in the recess, positioning the outer layer over a silicone pad, wherein the silicone pad defines a pressing surface and the pressing surface further defines at least one cavity; and pressing the outer layer into the at least one cavity with a forming press, such that an outer surface of the outer layer is in contact with the silicone pad along the pressing surface; and wherein the outer layer forms the recess within the at least one cavity.

Clause 19. The method of clause 18, further comprising: after bonding the inner layer to the outer layer, removing the upper from the silicone pad.

Clause 20. The method of any of clauses 13-19, further comprising: prior to placing the insert in the recess, die cutting the insert to a predetermined size and a predetermined shape, such that an outer perimeter of the insert corresponds to a shape of the recess; applying a graphic to an outer surface of the insert; and wherein the outer layer is formed of an at least partially transparent material such that the insert and the graphic are at least partially visible through the outer layer.

What is claimed is:

1. An article of footwear comprising:
    an upper at least partially surrounding an interior volume operative to receive a foot of a wearer, wherein the upper comprises:
    a one-piece inner layer, a one-piece outer layer, and an insert; wherein an inner surface of the outer layer defines a preformed recess such that the outer layer extends outwardly and away from the inner layer at the preformed recess independently of the inner layer and the insert;
    wherein each of the inner layer and the outer layer having a medial side portion extending in a forefoot region, a midfoot region, and a heel region of the upper, and a lateral side portion extending in the forefoot region, the midfoot region, and the heel region of the upper; wherein the inner layer is disposed between the interior volume and the outer layer; wherein the outer layer is coupled to the inner layer at a plurality of bonded areas such that the inner layer and the outer layer define a sealed closed pocket therebetween at the preformed recess, the sealed closed pocket entirely surrounded and enclosed by the bonded areas;
    wherein the insert is disposed entirely in the sealed closed pocket between the inner layer and the outer layer entirely inward of the bonded areas and such that the outer layer protrudes outwardly from the inner layer at the sealed closed pocket;

wherein an entire outer perimeter of the inner layer is coincident with an entire outer perimeter of the outer layer; and wherein the outer layer is formed of an at least partially transparent material, such that the insert is at least partially visible through the outer layer.

2. The article of footwear of claim 1 wherein the insert has an outer insert surface, wherein a graphic is applied to the outer insert surface and is at least partially visible through the outer layer.

3. The article of footwear of claim 1 wherein the insert is comprised of a compressible foam material.

4. The article of footwear of claim 3 wherein the compressible foam material is Ethylene-Vinyl Acetate (EVA) foam.

5. The article of footwear of claim 1, wherein the insert has an inner insert surface, an outer insert surface, and an insert thickness defined between the inner insert surface and the outer insert surface, wherein the inner insert surface is coupled to the inner layer entirely in the sealed closed pocket and the outer insert surface abuts the outer layer, such that the outer layer is spaced apart from the inner layer by the insert thickness throughout the sealed closed pocket.

6. The article of footwear of claim 5, wherein the outer layer and the insert are not fixed to one another.

7. The article of footwear of claim 5, the upper further comprising:
a hot melt layer coupled to the inner insert surface, and wherein the hot melt layer is configured to adhere the insert to an outer surface of the inner layer.

8. The article of footwear of claim 1, the upper further comprising:
a hot melt layer coupled to an inner surface of the outer layer at the bonded areas, and wherein the hot melt layer is configured to adhere an outer surface of the inner layer to the inner surface of the outer layer at the bonded areas.

9. The article of footwear of claim 1 wherein:
the preformed recess is one of a plurality of preformed recesses defined by the inner surface of the outer layer;
the sealed closed pocket is one of a plurality of sealed closed pockets defined by the inner layer and the outer layer at the plurality of preformed recesses, such that each of the sealed closed pockets is disposed between the inner layer and the outer layer and enclosed by the bonded areas;
the insert is one of a plurality of inserts;
each of the plurality of inserts is disposed in a different one of the sealed closed pockets; and
an outer surface of the outer layer extends outwardly and away from the inner layer at the plurality of preformed recesses independently of the inner layer and the plurality of inserts.

10. The article of footwear of claim 9, wherein the sealed closed pockets have a plurality of different predefined shapes; and wherein each of the inserts has an outer perimeter that corresponds with a respective one of the different predefined shapes.

11. The article of footwear of claim 10, further comprising:
a sole structure fixedly attached to the upper and underlying the interior volume; and wherein the sealed closed pockets are disposed in at least one of a lateral side, a medial side, or a vamp of the upper.

12. The article of footwear of claim 1, wherein each of the inner layer and the outer layer define a vamp.

13. The article of footwear of claim 1, wherein each of the inner layer and the outer layer define a throat opening at the interior volume.

14. The article of footwear of claim 1, wherein the outer layer defines the preformed recess even without the insert in the sealed closed pocket.

15. The article of footwear of claim 1, wherein the outer layer defines the preformed recess even without coupling the outer layer to the inner layer at the plurality of bonded areas.

16. An article of footwear comprising:
an upper at least partially surrounding an interior volume operative to receive a foot of a wearer, wherein the upper comprises:
a one-piece inner layer, a one-piece outer layer, and an insert; wherein an inner surface of the outer layer defines a preformed recess such that the outer layer extends outwardly and away from the inner layer at the preformed recess independently of the inner layer and the insert;
wherein each of the inner layer and the outer layer having a medial side portion extending in a forefoot region, a midfoot region, and a heel region of the upper, and a lateral side portion extending in the forefoot region, the midfoot region, and the heel region of the upper; wherein the inner layer is disposed between the interior volume and the outer layer; wherein the outer layer is coupled to the inner layer at a plurality of bonded areas such that the inner layer and the outer layer define a sealed closed pocket therebetween at the preformed recess, the sealed closed pocket entirely surrounded and enclosed by the bonded areas;
wherein the insert is disposed entirely in the sealed closed pocket between the inner layer and the outer layer entirely inward of the bonded areas and such that the outer layer protrudes outwardly from the inner layer at the sealed closed pocket; and
wherein an entire outer perimeter of the inner layer is coincident with an entire outer perimeter of the outer layer.

17. The article of footwear of claim 16 wherein:
the preformed recess is one of a plurality of preformed recesses defined by the inner surface of the outer layer;
the sealed closed pocket is one of a plurality of sealed closed pockets defined by the inner layer and the outer layer at the plurality of preformed recesses, such that each of the sealed closed pockets is disposed between the inner layer and the outer layer and enclosed by the bonded areas;
the insert is one of a plurality of inserts;
each of the plurality of inserts is disposed in a different one of the sealed closed pockets; and
an outer surface of the outer layer extends outwardly and away from the inner layer at the plurality of preformed recesses independently of the inner layer and the plurality of inserts.

18. The article of footwear of claim 17, wherein the sealed closed pockets have a plurality of different predefined shapes; and wherein each of the inserts has an outer perimeter that corresponds with a respective one of the different predefined shapes.

19. The article of footwear of claim 16, wherein the outer layer defines the preformed recess even without the insert in the sealed closed pocket.

20. The article of footwear of claim 16, wherein the outer layer defines the preformed recess even without coupling the outer layer to the inner layer at the plurality of bonded areas.

\* \* \* \* \*